(No Model.) 3 Sheets—Sheet 1.
L. A. ASPINWALL.
POTATO PLANTER.
No. 342,491. Patented May 25, 1886.
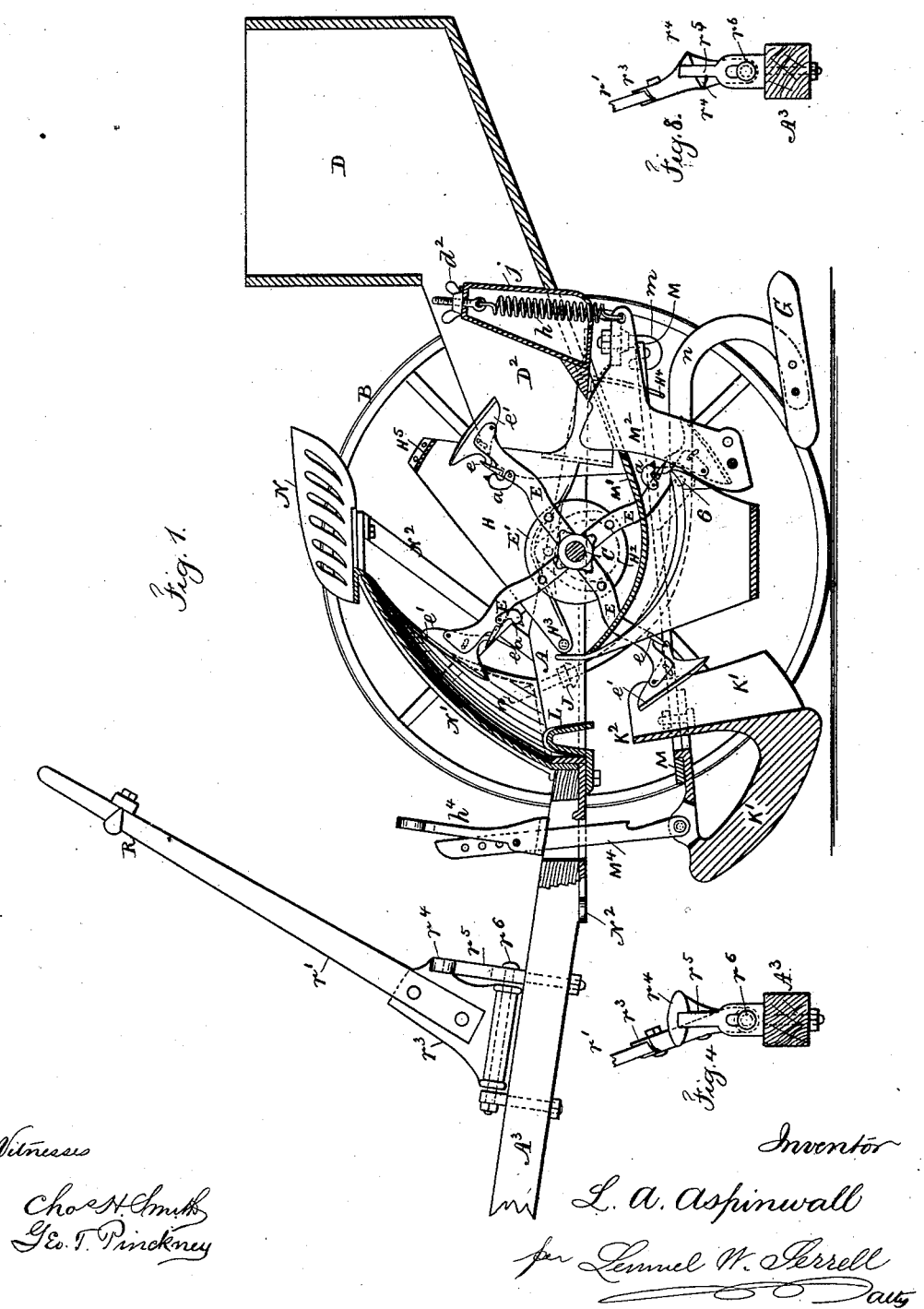

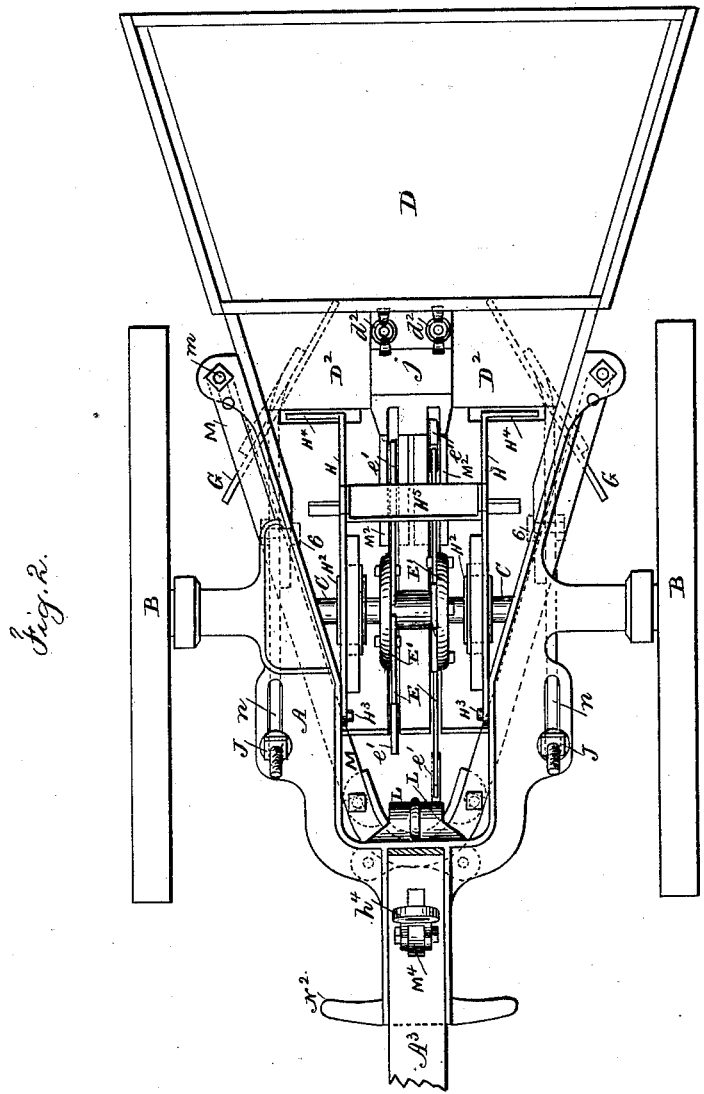

(No Model.) 3 Sheets—Sheet 3.
L. A. ASPINWALL.
POTATO PLANTER.
No. 342,491. Patented May 25, 1886.
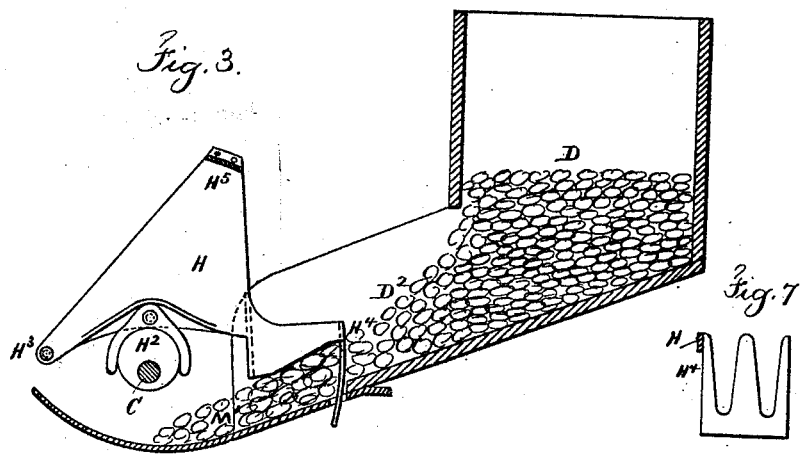
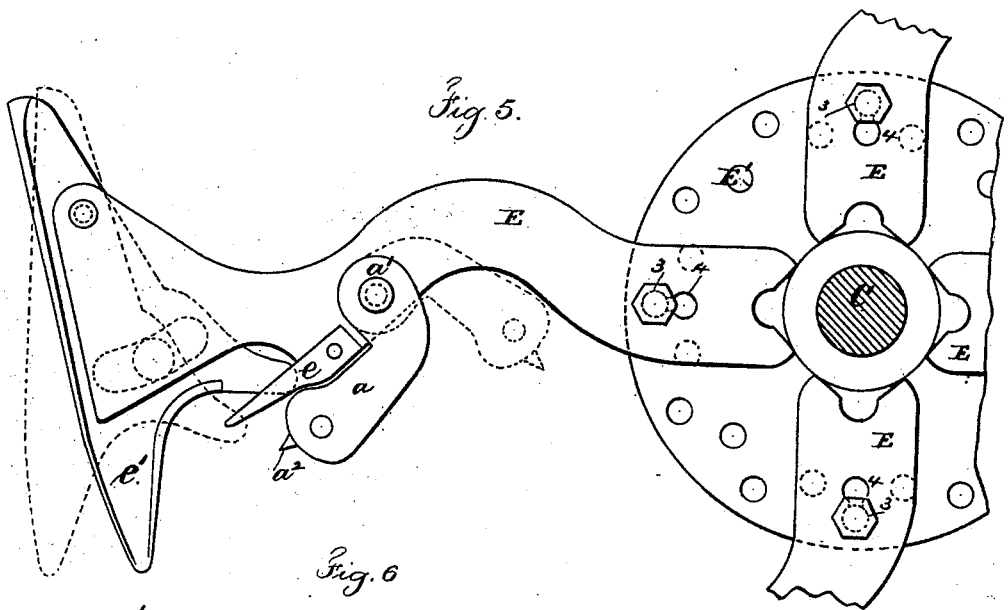
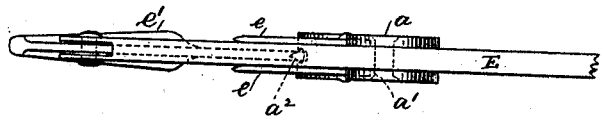
Witnesses
Chas. H. Smith
Geo. T. Pinckney
Inventor
L. A. Aspinwall
per Lemuel W. Serrell
atty

UNITED STATES PATENT OFFICE.

LEWIS AUGUSTUS ASPINWALL, OF THREE RIVERS, MICHIGAN, ASSIGNOR TO THE ASPINWALL MANUFACTURING COMPANY, OF TRENTON, N. J.

POTATO-PLANTER.

SPECIFICATION forming part of Letters Patent No. 342,491, dated May 25, 1886.

Application filed July 13, 1885. Serial No. 171,438. (No model.)

*To all whom it may concern:*

Be it known that I, LEWIS AUGUSTUS ASPINWALL, of Three Rivers, in the county of St. Joseph and State of Michigan, have invented an Improvement in Potato-Planters, of which the following is a specification.

My present potato-planter resembles that shown in my Patent No. 276,994, granted May 8, 1883, the improvements relating to the details of construction hereinafter set forth, whereby the planter is rendered more efficient and difficulties are overcome that I have discovered in constructing and testing such planters.

In the drawings, Figure 1 is a section of my planter longitudinally. Fig. 2 is a plan view with the seat removed. Fig. 3 is a section at the gate and mouth of the hopper. Fig. 4 is a rear view of the marker-lock. Fig. 5 is a side view, in larger size, of the picker. Fig. 6 is a plan view of the same. Fig. 7 is a face view of one of the hopper-gates, and Fig. 8 represents a modification of the marker-lock.

In my present improvements there is a main hopper, D, into which the potatoes are placed, wheels B and shaft C to support the machine, arms E, connected to the shaft C and carrying pickers $e\ e$, upon which the pieces of potato are impaled and lifted from the receiver M', and from which the potatoes or pieces are discharged by the action of the swinging liberators $e'$, as in the aforesaid patent, with the exception of the features hereinafter named.

In machines made according to my aforesaid Letters Patent I sometimes find, especially in going downhill, that the pieces of potato run too freely from the hopper and overflow the receiver. To prevent this I make use of gates $H^4$, that are attached to the back ends of the swinging frames H, that are pivoted at the front ends at $H^3$ and extend upwardly over the main shaft C, and there is a bridge, $H^5$, connecting the upper parts of the frames H, and upon the shaft C is a cam, $H^2$; or two cams may be used—one at each side. The cam $H^2$ lifts the gates $H^4$ once each revolution, and these gates $H^4$ are made as segments of cylinders passing through slots in the receiver at the bottom of the hopper-throats $D^2$. When the receivers below the gates $H^4$ are sufficiently free to allow frames H and the gates $H^4$ to drop, said gates pass down with their upper ends as low as the bottoms of the hopper-throats, and the potatoes run down into the receiver; but where the nearly horizontal portions of the hinged frames H are held up by resting upon the pieces of potato, then the gates are also held up, and act automatically to keep back the potatoes from sliding down the hopper-throats, and any overflow of the receiver will be avoided by holding back the potatoes in the hopper D.

The gates $H^4$ may each be a plain piece of metal; or each may be made with open slots therein, as shown in Fig. 7. The concaves $M^2$ are the same as those set forth in the aforesaid patent, and the springs $h$, that act upon them, are within a case, $j$, and adjusted by screws and thumb-nuts $d^2$. Each nut is kept from unscrewing accidentally by beveled ribs upon the top of the box $j$, against which a projection or flattened surface at one side of the nut passes and is raised and springs over as the nut is revolved.

Instead of bolting the pickers upon a single disk, and making bends or offsets in the picker-arms and right and left hand pickers, as in my aforesaid patent, I make the arms of the pickers E flat in one direction, and I employ two disks, E', upon the shaft C, and I make in each arm two bolt-holes, 3 4, and two rows of holes in each disk, so that the arms can be set to plant different distances apart, and the holes in the disks will not weaken them to the same extent as if placed in one row, and I provide a notch or forked end, which rests against the boss connecting the two disks, so the picker is held in position by a single bolt. I apply a pivoted thumb-piece, $a$, to this arm. It swings upon the pivot $a'$, and as the picker comes around and rises from below up through the concaves $M^2$ the thumb-piece will hang downwardly, and its pointed end $a^2$ will be near the stab-points $e$, and will aid in lifting and impaling large potatoes and holding the same while being carried over and discharged, as before; but if the pieces of potato are small, so that the points $a^2$ do not enter the same, the thumb-pieces $a$ will fall back into the position shown by dotted lines, Fig. 5, and the stab-points $e$ alone hold the same. The pickers come around in succession as the shaft C is revolved, and each lifts a piece of potato up and carries it over, and the liberators $e'$ force the pieces of potato off successively as such liberators come into contact with the stationary tripper L, that is made as a curved cam-plate fixed to the main frame A of the machine. The curved cam-plate acts more gradually and reliably than the roller in my aforesaid patent. The liberators $e'$ are constructed and operate substantially as in my aforesaid patent. The plow K' is runner-shaped, as in my aforesaid patent, and there is a flange extending behind the nose of the plow, to which is fastened the auxiliary frame M, and it extends above the same as a shield, as seen Fig. 1, to form a guide for the pieces of potato, and prevent them being thrown over in front of the plow, and also to prevent corn-stubs and other obstructions coming in contact with the pickers. The open mortise in the flange extending behind the nose of the plow $k'$, into which the lifting-bar $M^4$ is pivoted or bolted, passes entirely through the casting, to prevent the accumulation of earth and avoid all friction of the parts. This bar $M^4$ passes through a mortise in the frame at the back end of the tongue or pole $A^3$, and there is a toggle-handle, $h^4$, to lift the plow. By this construction any earth at the lower end of the lifter-bar $M^4$ does not interfere with its swinging motion.

At the back end of the frame M are hooks $m$, attached to the frame A by screw-shanks and nuts, which facilitate removal or repairs, and they are preferable to the eyebolts shown in my aforesaid patent.

The coverers G are upon the arms $n$, pivoted at 6 to brackets on the auxiliary frame M, and the front ends of these arms $n$ pass through slots in the frame A, and are provided with nuts J. These nuts prevent the coverers rising too high when in use, but allow such coverers to hang down and act upon the earth to cover the potatoes as planted.

Instead of making these coverers wide, as in my said patent, to act as hoes or scrapers, I make them narrow, so that they do not present much surface to act upon the earth, and these coverers will usually be in the earth and only press a portion of the same over the potatoes to cover them; hence the covering will be more uniform, because there is always more or less vertical motion to the planter as it rolls over uneven ground or stones.

In my aforesaid patented machine the scrapers acted more or less deeply in the earth, and were influenced by the vertical rising or falling motion of the planter, and covered the potatoes either too much or too little. By the use of the coverers G, that are narrow and always in the earth, this difficulty is avoided, as the coverers G act to the extent of their entire width, whether running at the surface or deep in the earth. The scrapers in my aforesaid patent acted entirely at the surface, and the quantity of earth moved by them constantly varied, according to the position of the scrapers to the surface.

The seat N is upon a shield or support, N', that extends downwardly and forward from the seat, and is bolted removably to the frame; or it may be hinged so that it can be swung forward to give access to the pickers; and there are, in addition, arms $N^2$, one at each side of the seat. The shield is rounded upon its outer surface, and protects the pickers from being entangled in the reins.

At the forward end of the frame A and at each side of the pole-socket there are foot-rests $N^2$, cast with the frame and projecting laterally, to enable the driver to brace himself firmly in his seat. In my aforesaid patent these rests were separate castings bolted to the frame.

The marker R is of ordinary construction. It is upon the arm $r'$, that is pivoted at its lower end, and is at a backward inclination, so as to be near to the driver, which is a great convenience.

At the lower end of the arm $r'$ is the pivot plate or head $r^3$, to which the arm is attached, and upon this head and as part of the same is a latch, $r^4$, with a notch and double inclinations upon its under surface, and the standard $r^5$ has a slot for the pivot-pin $r^6$, so that when the arm is moved to raise the marker the pivot-pin can rise in its slot in the standard as the inclined latch-piece $r^4$ is moved over the top of the standard $r^5$, and its notch catches the top of said standard and holds the marker in its elevated position.

The latch may be formed by two separate lugs, $r^4$, cast with the head $r^3$, as shown in Fig. 8, the operation of the parts being the same as those in Figs. 1 and 4.

I claim as my invention—

1. In a potato-planter, the combination, with the hopper for containing the potatoes or pieces and the throat from the same, of a gate passing down below the throat, and a frame or lever to carry the gate, and a cam to lift the frame and gate, substantially as set forth.

2. The combination, with the hopper and receiver, of picker-arms, a disk upon the main shaft, to which such arms are attached, points $e$, and thumb-pieces $a$, pivoted to the picker-arms, substantially as set forth.

3. The combination, in a potato-planter, of a hopper, a receiver formed of concaves connected together, the main shaft, two disks on the shaft, picker-arms fastened to the disks and revolving through the concaves, points and liberators upon the picker-arms, and the stationary tripper L, attached to the frame and formed as a cam, substantially as set forth.

4. The combination, with the hopper and receiver having concaves and the revolving pickers, of the springs connected to the ends of the concaves, the case to inclose the springs, the screws, and adjusting-nuts, substantially as set forth.

5. The combination, with the revolving pickers, liberators, and tripper L, of a plow, K', having a guard, K², extending up beneath the tripper, and the auxiliary frame for such plow, substantially as set forth.

6. The plow K', having a nose extending forward, and having an open mortise through the flange behind the nose, with flanges at the sides of said mortise, and the auxiliary frame M, to which the plow is fastened, in combination with the adjustable lifter-bar M⁴, pivoted at its lower end between said flanges, for the purposes and substantially as set forth.

7. The coverers G, formed as narrow blades, in combination with the arms $n$, pivoted at 6, by which they are held, the slotted frame A, through which said arms pass, and the adjusting-nuts upon the ends of the arms, substantially as set forth.

8. The frame A, having a socket for the pole, and the foot-rests N², one at each side of and cast with the socket, substantially as specified.

9. The marker-arm inclined backwardly, and the head or plate $r^3$, to which said arm is secured, in combination with the latch $r^4$ and the standard $r^5$, said standard being slotted for the pivot $r^6$ of the plate $r^3$, substantially as set forth.

Signed by me this 25th day of May, A. D. 1885.

LEWIS AUGUSTUS ASPINWALL.

Witnesses:
O. F. BEAN,
R. CRAW.